United States Patent Office 2,750,792
Patented June 19, 1956

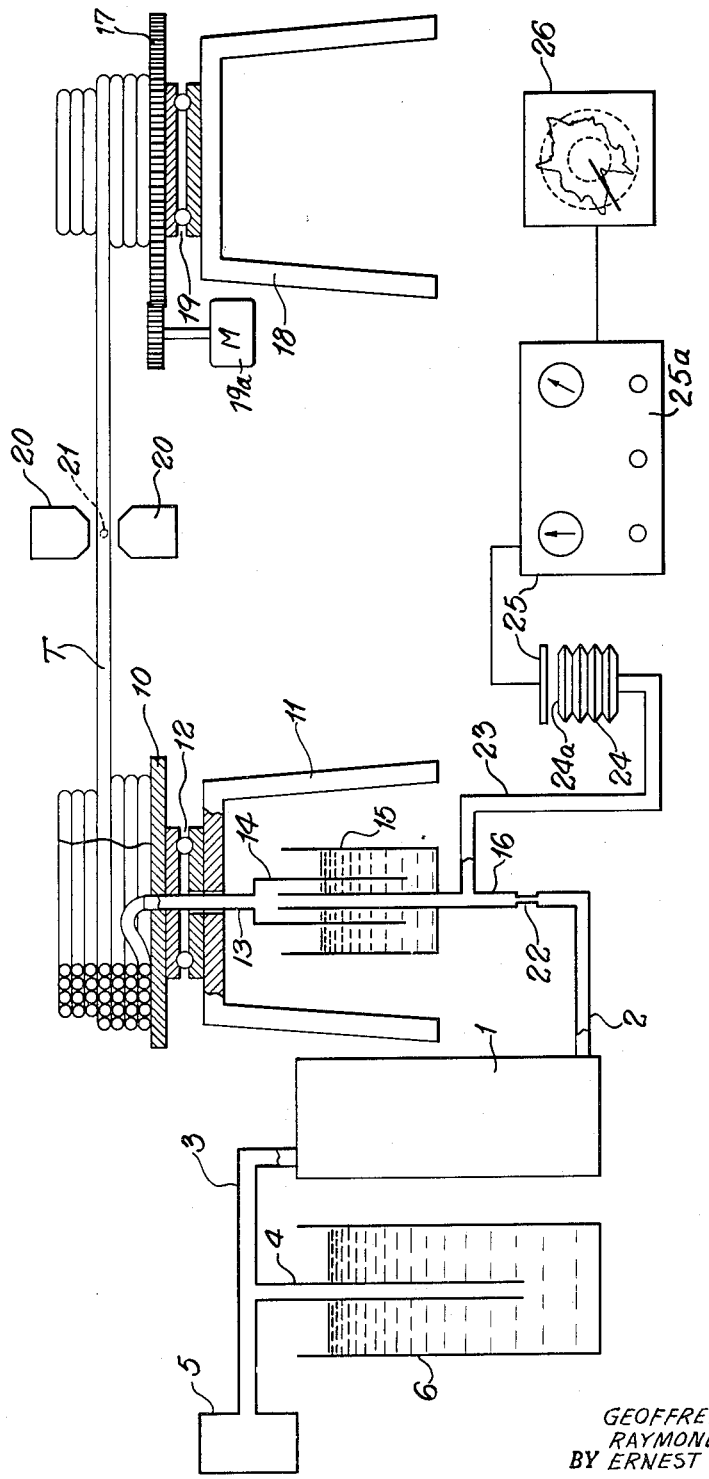

2,750,792

APPARATUS FOR MEASURING THE BORE OF TUBING

Geoffrey Fisher Morton, Sutton Coldfield, Raymond Chittleburgh, Birmingham, and Ernest Frederick Powell, Wylde Green, England, assignors to Dunlop Tire and Rubber Corporation, Buffalo, N. Y., a corporation of New York Application December 8, 1953, Serial No. 396,976

Claims priority, application Great Britain December 9, 1952

6 Claims. (Cl. 73—37.6)

Our invention relates to an apparatus for measuring the bore of tubing and in particular of tubing of rubber or other resilient material in which the bore is smooth.

Our invention provides an accurate apparatus for measuring the cross-sectional area of the bore of the tubing continuously throughout the length of the tubing.

The invention comprises connecting one end of the tubing through a first constriction to a supply of air at constant pressure, inserting a magnetisable ball in the tubing of less diameter than the least internal diameter of the tubing to form a second constriction, maintaining the ball stationary under the influence of a magnetic field while the tubing is moved relatively to the ball and continuously measuring the pressure of the air in the tubing between the two constrictions. To measure the pressure, preferably the air pressure between the constrictions is applied to a sensitive bellows and the expansion of the bellows is measured electrically.

In a preferred method of measuring the bore of the tubing, air at constant pressure is supplied through a rotating joint incorporating the first constriction to the end of a length of tubing coiled on a turntable. A steel ball forming the second constriction is placed in the free end of the coiled hose and held in position by an electromagnet. The turntable is rotated and the tubing is pulled between the poles of the electro-magnet and coiled up on a second turntable.

The back pressure between the constrictions is transmitted to a pressure sensitive bellows and indicated by a recording apparatus linked to an electrical detecting head sensitive to the movement of the bellows. The indication of the recording apparatus is related by suitable means, not shown, to the movement of the turntable delivering the hose in order that the back pressure can be deduced for each position of the steel ball relative to the tubing length.

For a constant pressure air supply, the magnitude of the back pressure between the two constrictions is related to the relative sizes of the constrictions and if the first constriction is of a fixed magnitude the back pressure is proportional to the magnitude of the second constriction. Under these conditions, measurement of the back pressure obtained by the recording apparatus gives an indication of the size of the second constriction and thus the bore diameter of the tubing. The sensitivity of the method increases with a decrease in size of the first constriction. Owing to the degree of variation in the bore of rubber tubing (for example $\pm 1/32''$ for tubing of $1/2''$ bore) there must be a relatively large difference between the diameter of the ball and the nominal bore of the tubing and this reduces the sensitivity of the method to such an extent that the change in back pressure cannot be satisfactorily measured by a water manometer and more sensitive pressure devices are necessary.

The various features of the invention are illustrated by way of example in the accompanying drawing, in which the arrangement of apparatus is shown diagrammatically.

As shown in the drawing, a supply of air at nearly constant pressure from a source 5 is fed through a conduit 3 into a reservoir 1 of large capacity, the outlet 2 of which is connected through a rotating joint to the tubing to be tested. Between the reservoir inlet 2 and the source 5 a downwardly extending branch pipe 4 is immersed in water 6 so that its outlet is at a depth corresponding to the required air pressure and forms a constant pressure head. The air supply is at a minimum pressure slightly above that required and excess air will escape through the end of the branch pipe. Air at constant pressure is then obtained at the outlet 2 of the reservoir.

A turntable 10 mounted on a fixed platform 11 by means of an anti-friction bearing 12 has an open ended pipe 13 extending downwardly through the bearing 12 and the platform 11. The upper end of the pipe is connected to a length of hose to be measured and the lower end 14 of the pipe is enlarged and is submerged below the level of a bath of mercury 15 located under the platform 11 and forms a rotary joint. The lower end of the pipe is of sufficient depth below the surface of the mercury to form an air seal for an air pressure greater than the pressure determined by the pressure head. An air pressure line 16 from the outlet 2 of the reservoir 1 is led upwardly through the mercury bath 15 to deliver into the enlarged lower end 14 of the tube 13 above the level of the mercury.

A second turntable 17 is mounted on a fixed platform 18 by means of an anti-friction bearing 19 adjacent the first turntable and is rotatable by a suitable motor indicated at 19a so that the tubing coiled on the latter can be transferred to the former by rotation thereof. A magnet 20 is mounted between the turntables and provides a magnetic field through which the tubing is passed when transferred from one turntable to the other. This magnetic field is of sufficient strength to maintain stationary a free steel ball 21 located in the tubing T passed between the magnet poles.

The air pressure line from the reservoir is provided with a first constriction 22 therein as close as possible to its open end and on the outlet side of this constriction a branch pipe 23 leads to a bellows 24 sensitive to fluid pressure changes as low as 0.0004 pound per square inch. An electrical capacity gauge 25 such as the "Fielden Proximity Meter" is adjustably mounted above the diaphragm 24a of the bellows 24 to detect minute movement of the diaphragm and the capacity gauge is electrically connected through a detecting and amplifying means 25a to a recording instrument 26. The recording instrument shows the variation in capacity between the bellows diaphragm 24a and the gauge 25, from which the movement of the diaphragm and consequently the pressure changes in the air line 16 may be deduced. As these pressure changes are related to the size of the second constriction in the tubing when connected to the air line 16, the bore of the tubing at any position of the steel ball 21 therein forming the second constriction can be calculated.

Alternatively the recording instrument can be calibrated to show the bore measurement directly for a given air supply pressure, a fixed size of first constriction and a ball of known diameter, compensation for the back pressure caused by tubing alone being effected by adjusting the zero position of the capacity gauge. This back pressure is dependent on the length and bore of the tubing under examination. In practice it may be necessary only to show limits of tolerance for the tubing bore on the recording instrument.

In operation, a length of flexible tubing T is coiled on the first turntable and connected to the upper end of the pipe of the pressure joint 13 and the air supply from the reservoir 1 is turned on. As the back pressure in the branch pipe 23 communicating with the bellows 24 is affected by the total length of tubing and its bore size, the recording instrument is adjusted to a zero indication by adjusting the position of the capacity gauge relative to the diaphragm. The ball 21 is then inserted in the end of the tubing. The tubing is then drawn off the first turntable 10 through the field of the magnet 20 and coiled on the second turntable 17 as the latter is rotated by the motor 19a. The ball is held stationary by the magnetic field and in consequence rolls along the length of tubing T. Variations in the tubing bore result in variations of the size of the second constriction along the tubing length and are indicated on the recording instrument 26.

Although the invention has been described with reference to flexible tubing of rubber or the like in which the bore may vary considerably, it is to be understood that the method of measurement is not limited to such tubing. For instance, rigid lengths of non-ferrous or glass tubing can be inspected in a similar manner. With these types of tubing the bore size is usually much more accurate and consequently the size of the second constriction can be decreased by using a ball which more closely approaches the size of the bore without danger of the ball sticking inside the tubing. It is then possible to measure the change in pressure by less sensitive means, for example, by a water manometer.

Having described our invention, what we claim is:

1. Apparatus for measuring the bore of a length of flexible tubing which comprises, a constant pressure air supply, a connection from said air supply to said tubing having a constriction, a magnetisable ball in said tubing of less diameter than the internal diameter of said tubing, an electro-magnet to hold said ball in fixed position relative to said electro-magnet, means to move said tubing lengthwise relative to said electro-magnet and ball and means to measure variations in pressure of air between said constriction and said ball.

2. The apparatus of claim 1 in which said means to move said tubing lengthwise comprises a pair of turntables between which said electro-magnet and ball are placed and in which one of said turntables comprises said connection.

3. The apparatus of claim 2 in which said connection comprises a rotatable joint between said connection and said turntable.

4. The apparatus of claim 3 in which said rotatable joint comprises a mercury bath, a pipe centered on said turntable and dipping into said bath and a pipe from said air supply extending upwardly through said mercury bath into said pipe from said turntable.

5. The apparatus of claim 1 having an expansible bellows connected to said connection between said constriction and said ball and indicating means actuated by said bellows.

6. The apparatus of claim 5 in which said indicating means comprises an electric circuit having an electric capacity gauge having an element spaced from a movable end of said bellows and an indicator actuated by the change in electrostatic capacity between said element and the end of the bellows as said end moves under pressure variations.

References Cited in the file of this patent

UNITED STATES PATENTS

| | | |
|---|---|---|
| 1,919,546 | Fletcher | July 25, 1933 |
| 2,014,998 | Baguley et al. | Sept. 17, 1935 |
| 2,026,187 | Mennesson | Dec. 31, 1935 |
| 2,244,864 | Witham | June 10, 1941 |
| 2,558,190 | Miller | June 26, 1951 |
| 2,589,251 | Heinz | Mar. 18, 1952 |
| 2,633,744 | Miller | Apr. 7, 1953 |
| 2,674,049 | James | Apr. 6, 1954 |